Aug. 8, 1933.  A. M. REMINGTON  1,921,039
METHOD AND APPARATUS FOR MAKING BAND SAWS
Filed May 29, 1931  2 Sheets-Sheet 1
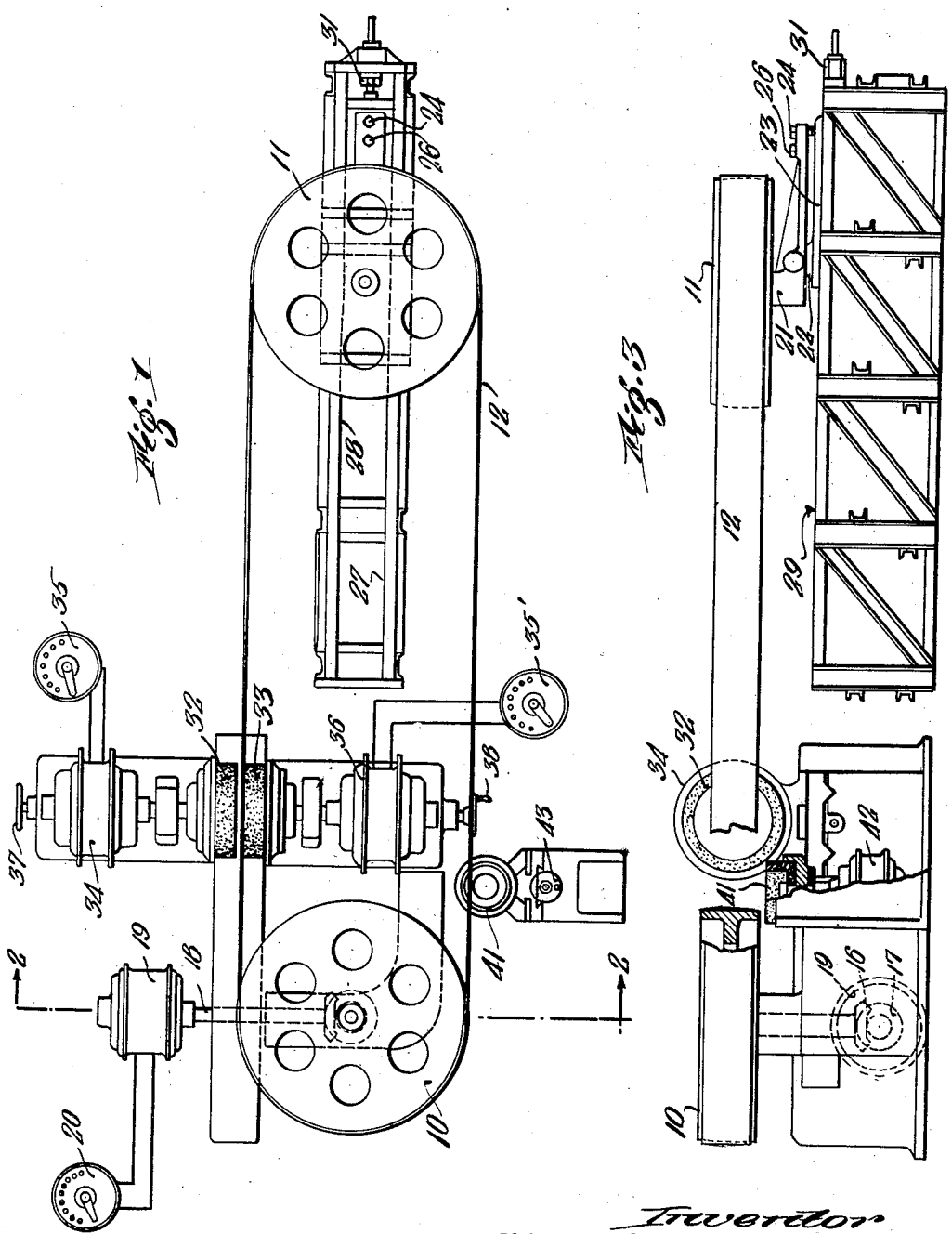

Aug. 8, 1933.   A. M. REMINGTON   1,921,039
METHOD AND APPARATUS FOR MAKING BAND SAWS
Filed May 29, 1931   2 Sheets-Sheet 2
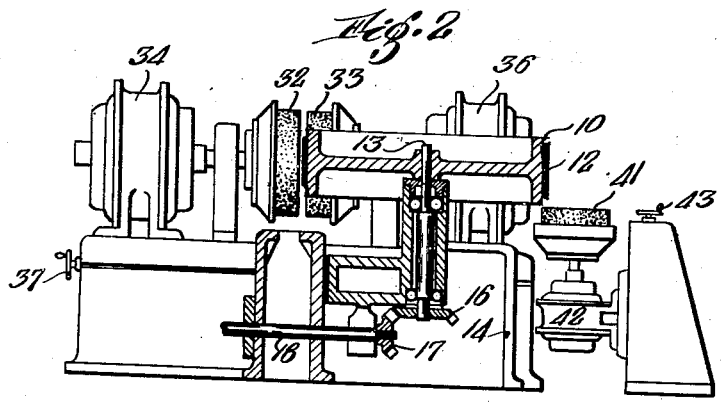
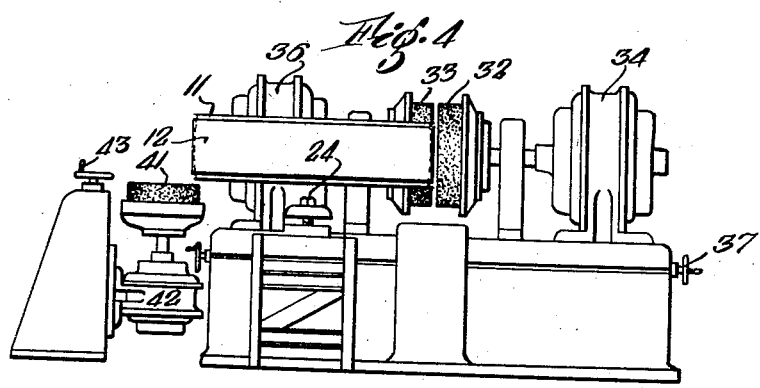

Patented Aug. 8, 1933

1,921,039

UNITED STATES PATENT OFFICE 1,921,039

METHOD AND APPARATUS FOR MAKING BAND SAWS

Alfred M. Remington, Fitchburg, Mass., assignor to Simonds Saw and Steel Company, Fitchburg, Mass., a Corporation of Massachusetts Application May 29, 1931. Serial No. 541,046

7 Claims. (Cl. 51—112)

This invention relates to the manufacture of band saws and to a method as well as to apparatus for making articles of this general class. These saws are relatively thin and quite flexible; hence considerable care must be exercised during manufacture to avoid imposing excessive stresses or otherwise subjecting the saw to a treatment which may result in damage or otherwise impair the efficiency of the finished product. During the process of manufacture the saws are ground and polished. It is very difficult and often impractical to attempt to remove all of the marks of the grinding wheel, and yet if any of these marks are permitted to remain, there is always the possibility that under the usual operating conditions wherein the saw is subjected to repeated bending or flexing, tiny fissures or cracks will develop or open up along marks left by the tool.

It is highly desirable therefore that the grinding and polishing operation be so conducted that any marks or traces left by the tool will extend longitudinally and not transversely of the saw. When this is done the tendency for cracks to form transversely becomes practically negligible. For these reasons the grinding and/or polishing tools have been operated so that their effective surfaces travel substantially longitudinally of the saw. Moreover, as it is not advisable to subject these saws to a stress greater than the elastic limit of the steel during these operations, the stock has been passed over the grinding tool at a relatively low velocity and in the direction of rotation of the tool.

In the manufacture of band saws after the stock receives the usual heat treatment it is black and relatively rough so that it requires grinding to reduce it substantially to the desired size or thickness and polishing to finsh the saw. At some stage in the manufacture the stock must be toothed, cut to length, the ends brazed or otherwise joined together, and the joint or braze finished off. It is customary immediately following the heat treatment to grind a saw alternately on one side and then on the other by passing the saw slowly across a grinding wheel in the direction of rotation thereof. When opposite sides have been ground successively in this manner, the saw is toothed, cut to length, the ends brazed together, the braze finished off, and finally the saw is polished. The finishing off operation, after brazing, ordinarily comprises grinding and filing, which naturally reduces the thickness at this point; and this reduction in thickness remains in the finished saw inasmuch as the subsequent polishing operation merely smooths up the saw and gives it a semi-gloss surface.

By this mode of procedure the grinding and polishing operations require separate handling of the saw, but as the teeth are formed after the grinding operation, it is thus assured that the toothed edge will not be subjected to unequal stresses by this operation. Although a band saw must be perfectly balanced in order to avoid vibration and whip, it has been impossible heretofore to produce a saw meeting these requirements by methods such as the above or others suitable for use on a manufacturing basis.

Objects of this invention are to provide a simple and practical method for making a substantially perfectly balanced saw; to improve the art of making articles of the class referred to so as materially to reduce the time required for manufacture; to provide for performing the grinding and polishing operations with only one handling of the saw as well as to provide for reducing the time required for each of these operations; to provide for carrying out the grinding and polishing operations with such accuracy and precision as to assure a substantially perfect balance in the finished saw; to provide apparatus for these purposes of simple, efficient and yet rugged and durable construction consisting of few parts which are relatively inexpensive to manufacture and to maintain; and also to provide apparatus of the class described having an improved construction and relative arrangement of parts.

In the drawings:

Fig. 1 is a top plan view of an apparatus for grinding and polishing a band saw;

Fig. 2 is a section along the line 2—2 of Fig. 1;

Fig. 3 is a side elevation of the apparatus shown in Fig. 1 with certain parts broken away; and Fig. 4 is an end elevation of the right end of this apparatus as viewed in Figs. 1 and 3.

In the apparatus selected for illustration, driven and idler pulleys 10 and 11 have crowned faces over which a band saw 12 may be trained. As shown more clearly in Fig. 2 the driven pulley is fast on a vertical shaft 13 which is rotatably supported in the foundation structure 14 and carries at its lower end a bevel gear 16, which meshes with a bevel gear 17 on a horizontal shaft 18 likewise rotatably mounted in the foundation structure 14. A motor 19 has a variable resistance 20 in its field circuit and is connected to the shaft 18 for transmitting power to the driven pulley 10 and thus causing the saw 12 to travel about the pulleys 10 and 11.

The idler pulley 11 is journaled upon a support 21 which is mounted in a bracket 22 to pivot about a transverse horizontal axis, this bracket being carried by a slidable support 23. Adjusting and locking screws 24 and 26 are mounted in a rearward extension of the support 21 and engage the support 23 for adjusting the pulley 11 about a transverse horizontal axis extending through the pivotal support provided by a bracket 22. The slidable support 23 rests on ways 27 and 28 by which it is guided for movement thereon toward and from the driven pulley 10, these ways being carried by a suitable framework 29. Gauging or adjusting means 31 may also be mounted in the framework 27 for adjusting the distance between the axes of the pulleys 10 and 11.

At some convenient point along the course of travel of the saw 12, cup or ring type grinding wheels 32 and 33 having annular grinding faces preferably of substantially the same size are arranged in axially aligned, opposed relation on opposite sides of the saw. These wheels may be driven individually by suitable motors 34 and 36 having like characteristics and as the motors are arranged in opposed relation it will be evident that the grinding faces of the wheels will rotate in opposite directions. Each motor grinder assembly 32, 34 and 33, 36 is provided with manually operable means 37 and 38 respectively for adjusting the position of these grinding wheels toward and from the course of travel of the saw. Variable resistances 35, 35' are interposed in the field circuits of these motors for controlling the speed thereof. For grinding the back edge of the saw there is provided a ring or cup type grinder 41, which is equipped with an individual motor drive 42 and is adjustable vertically toward and from the back or lower edge of the saw as viewed in Figs. 3 and 4 by a manually operable adjusting means indicated generally at 43.

In practicing the present invention the stock to be used may be given its heat treatment in the usual manner. Preferably the next step following the heat treatment is that of toothing the strip, after which it is cut to the desired length and the ends joined together by fusion of metal, preferably by brazing, these operations being performed according to practices well understood in this art. The relatively rough, black strip as it is received from the heat treatment is thus formed into a toothed, continuous band 12 which is trained over the driven and idler pulleys 10 and 11, and the latter pulley being properly adjusted, the driving motor 19 is actuated to cause the band to travel at the desired speed. The opposed grinders are adjusted first to grind down the brazed portion, these grinders being operated during this and the subsequent grinding operation at the speed at which they were designed to function. As the braze is finished off the motor 19 driving the band is controlled through its rheostat to establish and maintain relative speeds of travel for the band and the opposed grinders such that the latter will leave grinding marks extending transversely of the stock. The opposed grinders are adjusted properly to engage opposite sides of the strip or band to grind the latter substantially to finished size. The edge grinder 41 may also be adjusted to grind the back or lower edge of the band during these operations.

The use of ring type grinders arranged in this manner reduces the time required for the grinding operation not only by providing for grinding both sides simultaneously, but also by making it possible properly to grind the saw while it is traveling at a relatively high speed. Thus while the saw is being ground, it may be driven at eight hundred or even more feet per minute, whereas heretofore it has not been feasible to attempt to grind saws traveling at more than approximately sixty feet per minute.

When the opposite sides have been ground in this manner substantially to finish dimensions the relative speeds of the band and the opposed grinders are changed to a condition such that the marks left by these grinders will extend in a direction which at least approximates the direction of motion of the band or is longitudinal of this band. This may be accomplished by slowing down the grinders far below their normal speeds, as for example to a speed of only 1 R. P. M., or by increasing the speed of the band, but preferably these results are obtained by both of these methods. Thus as the grinders are slowed down the velocity of the band may be increased to around 3600 or even to 5000 or more feet per minute. This subsequent operation at this changed relative speed need be continued only for the last minute or two of the process and during this period the opposed grinders are set to polish the band. The edge grinder 41 is also slowed down in a like manner during the polishing operation.

As the marks made by the grinders during this latter period extend longitudinally of the band, this final operation serves to lay the grain of the finished saw as well as to remove any transversely extending marks. This practically eliminates the possibility of having transverse cracks form or develop along marks left by the grinders. This changing of the direction of the marks also appears to reduce the tendency for cracks to develop in any direction.

By this mode of procedure all of the grinding and polishing operations may be performed in one machine and with one handling of the stock. Even more important however is the fact that by this method wherein the brazing is performed before the grinding operation, the braze is finished in the grinding, thereby eliminating a weak section so that it becomes possible to produce a saw having a uniform thickness to 0.0001" which for all practical purposes is a perfectly balanced saw, a result which has not been obtained heretofore with methods adaptable to manufacturing conditions.

Moreover this process effects a considerable saving in time and labor and provides for accomplishing these results without at any time subjecting the stock to excessive stresses or to other severe treatment likely to affect adversely the properties or life of the finished article. It will be evident that by arranging the grinders in aligned relation so that their opposed grinding surfaces turn in opposite directions any tendency for the saw to twist or become distorted is reduced to a minimum and also this arrangement contributes materially to the desired result by relieving the thin flexible stock from any objectionable stresses to which it might otherwise be subjected.

It should be understood that the present disclosure is for the purpose of illustration only and that this invention includes all modifications and equivalents which fall within the scope of the appended claims.

I claim:

1. The improvement in the art of finishing a surface of a piece of stock, which comprises maintaining a grinding surface in opposed substantially parallel relation with the surface to be finished while causing the stock and the grinding surface to travel in different directions, establishing relative speeds of travel for the stock and for the grinding surface such that the latter leaves grinding marks on the stock extending transversely of the direction of travel of the latter, and subsequently changing these relative speeds to cause grinding surface to leave marks extending along the stock approximately in the direction of travel thereof.

2. The improvement in the art of finishing a relatively thin flexible strip of stock, which comprises causing the strip to travel in a closed path while maintaining a grinding surface in motion transversely of the path and at a position to engage the passing strip, establishing relative speeds of travel for the stock and for the grinding surface such that the latter leaves grinding marks on the stock extending transversely of the direction of travel of the latter, and subsequently changing these relative speeds to cause the grinding surface to leave marks extending along the stock approximately in the direction of travel thereof.

3. The improvement in the art of finishing relatively thin, flat strips of stock, which comprises grinding opposite sides of a strip of stock by causing the latter to travel between opposed substantially parallel grinding surfaces while causing these grinding surfaces to travel transversely of the direction of travel of the stock, establishing relative speeds of travel for the stock and for the grinding surfaces such that the latter leave grinding marks extending transversely of the stock, and subsequently changing these relative speeds to cause the grinding surfaces to leave marks extending approximately longitudinally of the stock.

4. The improvement in the art of finishing relatively thin, flat strips of stock, which comprises grinding opposite sides of a strip of stock by causing the latter to travel between opposed substantially parallel grinding surfaces while causing these grinding surfaces to travel transversely of the direction of travel of the stock, establishing relative speeds of travel for the stock and for the grinding surfaces such that the latter leave grinding marks extending transversely of the stock, subsequently changing these relative speeds to cause the grinding surfaces to leave marks extending approximately longitudinally of the stock, and spacing the grinding surfaces for polishing the stock during the subsequent period of operation at changed relative speeds.

5. The improvement in the art of making band saws, which comprises toothing a strip of stock, securing the ends of the strip together to form a continuous strip, thereafter grinding and polishing opposite sides of the strip as one substantially continuous operation by causing the strip to travel in a substantially closed path extending between opposed substantially parallel grinding surfaces while causing these grinding surfaces to travel transversely of the direction of motion of the stock, establishing relative speeds of travel for the stock and for the grinding surfaces such that during the grinding operations these grinding surfaces leave marks extending transversely of the stock, and subsequently changing these relative speeds to cause the grinding surfaces to leave marks extending approximately longitudinally of the stock.

6. The improvement in the art of making band saws, which comprises toothing a strip of stock, brazing the ends of the strip together to form a continuous strip, grinding the brazed portions and also grinding and polishing opposite sides of the strip as one substantially continuous operation by causing the stock to travel in a substantially closed path between opposed substantially parallel grinding surfaces while causing these grinding surfaces to travel transversely of the direction of motion of the stock, continuing this operation until the brazed portion is ground down, establishing relative speeds of travel for the stock and for the grinding surfaces, such that during the grinding operation these grinding surfaces leave marks extending transversely of the stock, and subsequently changing these relative speeds to cause the grinding surfaces to leave marks extending approximately longitudinally of the stock.

7. Apparatus for finishing a flexible strip of stock comprising means for causing the strip to travel through a substantially closed path, a member having a grinding surface disposed adjacent the path and in position to engage a side of the strip as the latter moves through the path, means for actuating the member to cause the grinding surface thereof to move transversely of the direction of motion of the strip as the latter travels through the path, means for producing such relative speeds of travel for the strip and for the grinding surface as to cause the latter to leave marks on the strip extending transversely thereof, and means for changing these relative speeds so as to cause the marks made by the grinding surface to extend at least approximately longitudinally of the strip.

ALFRED M. REMINGTON.